United States Patent [19]
Tournier

[11] Patent Number: 6,097,322
[45] Date of Patent: Aug. 1, 2000

[54] DEVICE AND METHOD FOR CONTROLLING THE SAMPLING OF A SIGNAL CONVEYING BINARY INFORMATION CODED ACCORDING TO A TWO-PHASE CODE

[75] Inventor: Christian Tournier, Seyssinet-Pariset, France

[73] Assignee: STMicroelectronics S.A., Gentilly, France

[21] Appl. No.: 09/159,319

[22] Filed: Sep. 23, 1998

[30] Foreign Application Priority Data

Sep. 24, 1997 [FR] France ................................. 97 11864

[51] Int. Cl.⁷ .............................. H03H 7/12; H03H 13/00
[52] U.S. Cl. ................................. 341/70; 341/94; 341/71
[58] Field of Search .................... 341/70, 94, 71

[56] References Cited

U.S. PATENT DOCUMENTS 5,491,713  2/1996  Kwok et al. .......................... 375/333

FOREIGN PATENT DOCUMENTS 0 707 391 A2   4/1996   European Pat. Off. .
0 773 653 A2   5/1997   European Pat. Off. .

OTHER PUBLICATIONS

Preliminary European Search Report dated Jul. 3, 1998 with annex on French Application No. 97 11864.

*Primary Examiner*—Trong Phan
*Attorney, Agent, or Firm*—Theodore E. Galanthay; Fleit, Kain, Gibbons, Gutman & Bongini PL

[57] ABSTRACT

A device including a mechanism (4) for generating a counting clock signal (CKM) whose frequency is less than or equal to n times twice the transmission frequency. The device also includes a detection mechanism (10) for detecting the transitions (TD) of the signal (DS) at the counting frequency and for delivering corresponding detection signals (ST), a selection mechanism (2) for receiving each detection signal (ST) and for delivering or otherwise a selection signal (RS) depending on the satisfying or otherwise of a predetermined selection criterion, and a frequency divider-by-n (30) which receives the counting clock signal, in order to sample the carrier signal after a predetermined time delay (Tr) after each detected transition. Provided are a sampling control device and method which are completely digital and therefore use no analog component of the phase-locked loop type and are very simple to produce at an industrially economical cost.

13 Claims, 3 Drawing Sheets

DEVICE AND METHOD FOR CONTROLLING THE SAMPLING OF A SIGNAL CONVEYING BINARY INFORMATION CODED ACCORDING TO A TWO-PHASE CODE

CROSS REFERENCE TO RELATED APPLICATIONS

This application is based upon and claims the benefit of the priority of the prior French patent application 97 11864 filed on Sep. 24, 1997, the contents of which are incorporated by reference herein.

BACKGROUND OF THE INVENTION

1. Field of the Invention

The invention relates generally to communications and relates more particularly to the sampling of a signal comprising a succession of transitions of level which are representative of a two-phase coding of binary information. The invention applies advantageously but not limitingly to the sampling of a video signal with a view to extracting therefrom the digital information which it contains.

2. Description of the Prior Art

Within the meaning of the present invention, a two-phase coding is a coding in which at least some of the binary information is coded by means of pulses whose pulse duration is equal to the period of transmission of this binary information, and which exhibit an inversion of polarity (transition) in the middle of the said pulse duration, that is to say in the middle of the binary information transmitted.

More precisely, the code known by those skilled in the art as the "Manchester code" may be mentioned in this regard, the latter generating transitions for each binary information element, irrespective of the sequence sent. A logic "1" in this code is coded as a rectangular pulse whose duration is equal to the period of transmission, with inversion of polarity in the middle of the bit, the first half being of positive sign. A logic "0" is coded as a pulse of identical duration but opposite polarity.

Another so-called "two-phase" code is known to those skilled in the art as the "Miller code". According to this code, a logic "1" is coded by using a pulse of the Manchester type, that is to say a rectangular pulse with inversion of polarity in the middle of the bit while a logic "0" is coded using a rectangular pulse with no change of polarity. The polarity of the pulses corresponding to the sending of a logic "1" is chosen in such a way as to guarantee continuity with the previous pulse. As far as the polarity of the pulses corresponding to the sending of a logic "0" is concerned, it ensures continuity (non-transition) after a logic "1", but it is inverted after a previous "0". Additionally, in this code, the signal contains one transition at least every two bit durations, thereby ensuring sufficient transitions for recovery of the data stream.

Several methods for sampling such a signal are currently known. A first method consists in using an analog system relying on phase-servo control and frequency-servo control, using a phase-locked loop, thus making it possible to obtain a clock signal which is servo controlled to the frequency of transmission of the data and which is in phase with the transitions of these same data. However, this method has the drawback of requiring the use of a phase-locked loop, because this is an analog system, which is difficult to manage and relatively expensive to use.

A second method consists in using a system which carries out, in a first step, the analog/digital conversion of the data and then, in a second step, the processing of its samples by one or several more or less complex signal processing algorithms. This solution, although it fully satisfies the reproducibility criterion on account of its basically digital nature, on the other hand does not actually make it possible to obtain a truly economically beneficial solution, especially when it is intended to be incorporated into industrially mass-produced systems.

Accordingly, there is a need for a method and device which overcomes these limitations.

SUMMARY OF THE INVENTION

Briefly, according to one aspect of the invention, a method for controlling the sampling of a signal comprises five steps. The signal contains a succession of transitions of level which are representative of two-phase coding of a binary information stream, and the coded information is transmitted at a transmission frequency which has a corresponding transmission period. The first step is generating a counting clock signal. The counting clock signal has a counting frequency that is at most equal to 2n times the transmission frequency, and has a corresponding counting period, and n is an integer. The second step is detecting the transitions of the signal, using the counting clock signal. The third step is determining whether or not a selection criterion is satisfied. The fourth step is delivering, if the selection criterion is satisfied, a first sampling control signal. The fifth step is potentially delivering a second sampling control signal. The second sampling control signal is delivered if the selection criterion is not satisfied again within a spacing period after being satisfied.

BRIEF DESCRIPTION OF THE DRAWINGS

Other advantages and characteristics of the invention will emerge on examining the detailed description of a wholly non-limiting embodiment and the appended drawings in which.

DETAILED DESCRIPTION OF AN EMBODIMENT

Figure 1:
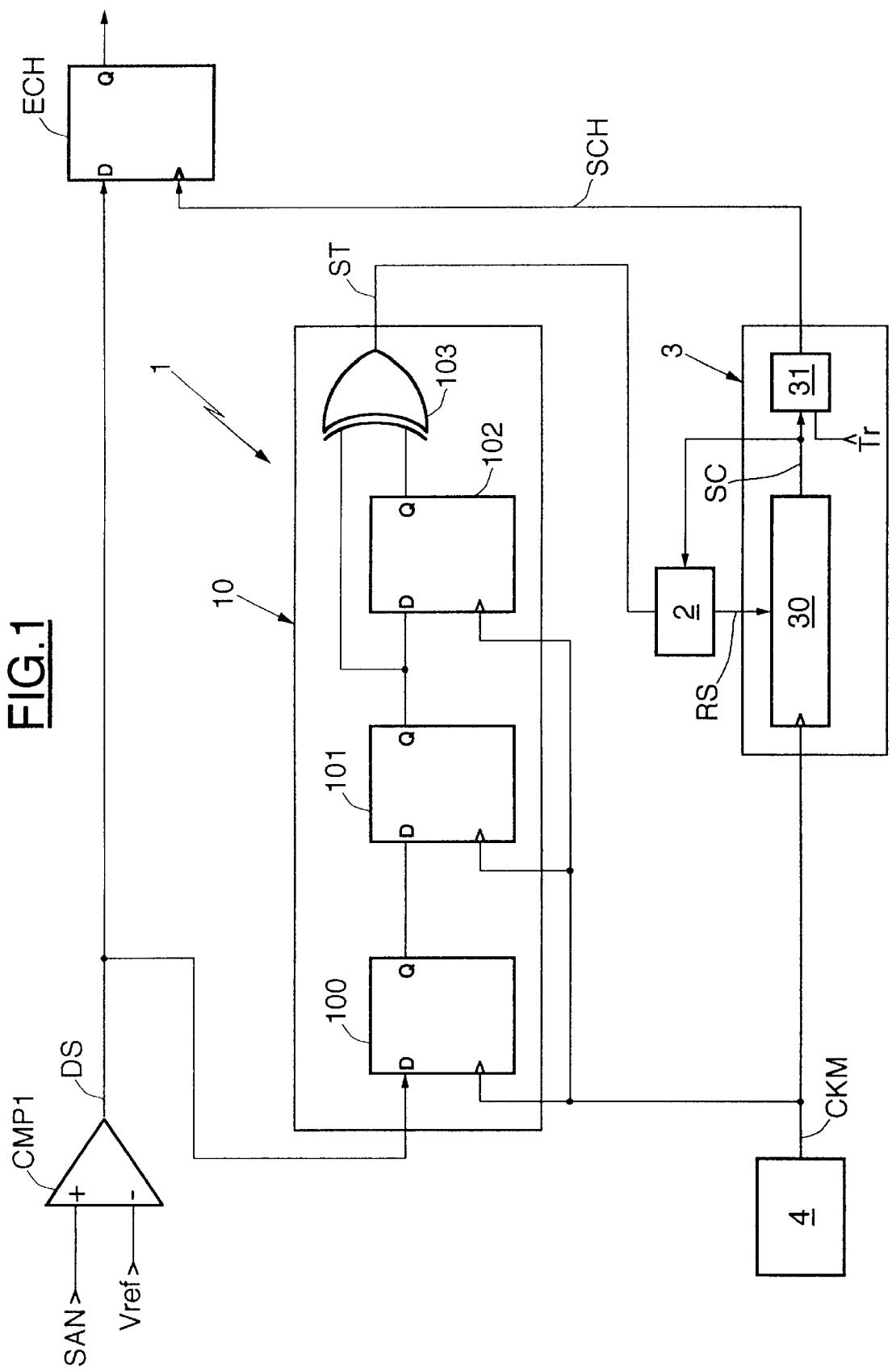
FIG. 1 is a schematic overview of a sampling control device according to the invention.

The invention aims to afford a solution to this problem and to propose a sampling control device which is completely digital and therefore uses no analog component of the phase-locked loop type and is very simple to produce at an industrially economical cost.

The invention therefore proposes a device for controlling the sampling of a signal comprising a succession of transitions of level which are representative of a two-phase coding of binary information transmitted by this signal according to a predetermined transmission frequency (for example 2.5 MHz).

According to a general characteristic of the invention, this device comprises means of generating a "counting" clock signal whose frequency is less than or equal to n times twice the transmission frequency (for example 48 MHz for n=10), detection means for detecting the transitions of the signal at the said counting frequency and for delivering corresponding detection signals, selection means for receiving each detection signal and for delivering or otherwise a selection signal depending on the satisfying or otherwise of a predetermined selection criterion, and sampling control means comprising means of frequency division by n which receive the counting clock signal, these sampling control means being able, on receipt of each selection signal, to deliver a first sampling control signal after a predetermined time delay which is less than half the period of transmission of the binary information (so as not to mask future transitions) and, in the absence of any new selection signal in the course of a spacing duration equal to n times the counting period, to deliver a second sampling control signal temporally spaced from the first sampling control signal by this spacing duration.

In certain applications in which the signal carrying the data (binary information) has not undergone any distortions deemed to be significant, the time delay can be set to a very low value, or even to a near-zero or zero value. Additionally, in this type of application it is possible to envisage delivering a selection signal for each detection signal. Stated otherwise, all the detected transitions of the signal will then be taken into account.

This being so, in numerous applications the signal may have undergone significant distortions during transmission thereof, especially during radio or cable transmission, possibly combined with phenomena of attenuation, recombination of echoes of this signal, addition of external disturbances or non-linear frequency distortions. Also, in order to perform as it were a filtering of this noise and of the data distortions, the time delay will be set to a predetermined value. Additionally, to avoid having to reinitialize the frequency divider on transitions which are overly close to one another and which do not represent transitions arising from the coding proper of the binary information, but which are the consequence of these distortions, advantageously no account will be taken of the later detected transitions which are however overly close to a previously detected transition.

Thus, stated otherwise, the invention provides for the use of a frequency divider which receives a sufficiently high fixed frequency, this divider being reset with each transition of the data received (possibly having regard to the filtering mentioned above) so as to deliver at least one clock pulse serving to sample this datum, that is to say the carrier signal.

Although the frequency of the counting signal must be less than n times twice the transmission frequency, the lower limit of this counting frequency must be set having regard to the accuracy desired in the application envisaged. For maximum accuracy, for fixed n, a frequency of the counting signal less than n times twice the transmission frequency and greater than n−1 times twice the transmission frequency will be chosen and preferably a frequency lying in the lower vicinity of the upper limit of this interval will be chosen.

According to one embodiment of the invention, the frequency division means comprises a counter modulo n clocked by the counting clock signal, which can be initialized to an initial counting value in the presence of each selection signal. Each sampling control signal is then delivered whenever the counter reaches a first counting value.

The time delay is then equal to a first predetermined number of periods of the counting signal, the difference between the first counting value and the initial counting value corresponding to this first predetermined number of periods.

According to one embodiment of the invention, the selection means comprises means able to reckon the duration separating two consecutive detected transitions, the selection criterion consisting in verifying that this duration is greater than or equal to a predetermined latency duration. This latency duration is advantageously equal to a second predetermined number of periods of the counting signal. The selection means thus comprises comparison means able to compare the current value of the counter with a second predetermined counting value, the difference between the second counting value and the initial counting value corresponding to this second predetermined number of periods.

So as further to optimize performance of the system, and in particular to be less sensitive to spurious spikes lying between two useful transitions of the signal and possibly leading to false sampling values, the sampling control means advantageously deliver several sampling control signals so as to perform an oversampling of the signal and allow the implementation of majority logic downstream for better determination of the exact value of the carrier signal.

In FIG. 1 an analog signal SAN, for example a video signal output by a video recorder, and containing digital information coded by a two-phase coding, is delivered to a first input of a comparator CMP1 whose other input receives a chosen reference value Vref. The output of this comparator CMP1 delivers a carrier signal DS composed of a succession of transitions of level which are representative of the two-phase coding of the binary information.

Figure 2:
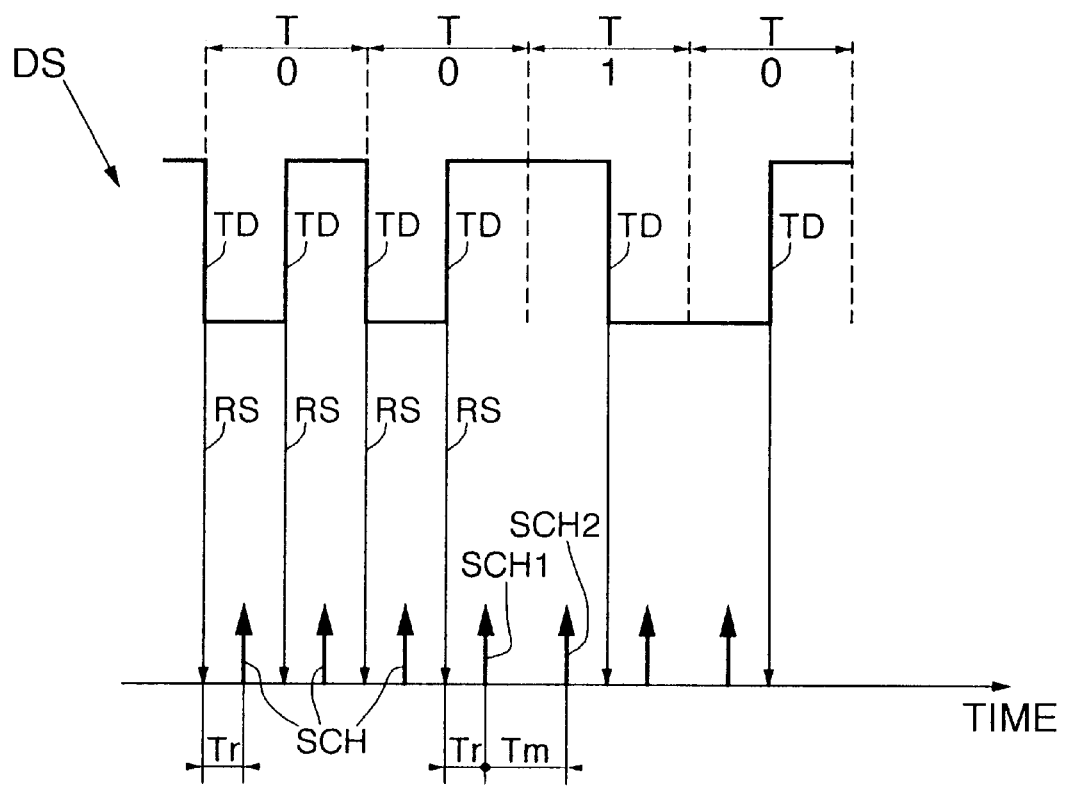
FIG. 2 illustrates a mode of implementation of the invention, applied to a two-phase coding of the Manchester type.

An example of such a signal DS is illustrated in the top part of FIG. 2 which illustrates a two-phase coding of the Manchester type.

More precisely, the binary information is transmitted periodically by the signal according to a transmission frequency F corresponding to a transmission period T. By way of indication, the transmission frequency may be equal to 2.5 MHz corresponding to a period T of 0.4 μs (duration of transmission of the binary information item).

As illustrated in this FIG. 2, a logic "1" in this code is coded as a rectangular pulse of duration T with inversion of polarity in the middle of the binary information, the first half being of positive sign. A "0" is coded as an identical pulse but of opposite polarity. It is therefore noted that the transitions TD of the signal DS are spaced apart by half T/2 the transmission period T, except when two binary information items with different logic values follow one another. In this case, the two transitions of the signal DS are spaced apart by the transmission period T.

Returning now more particularly to FIG. 1, it may be seen that the sampling control device 1 according to the invention comprises generating means 4, for example a quartz, able to generate a so-called "counting" clock signal, CKM, whose frequency is chosen to be less than or equal to n times twice the transmission frequency F. In practice, n is a sufficiently high integer, at least greater than or equal to 3 and for example equal to 10. In the case where the frequency of transmission of the binary information is equal to 2.5 MHz, corresponding to a maximum frequency of the transitions of 5 MHz, a counting frequency of 48 MHz will advantageously be chosen for the signal CKM.

The device 1 also comprises detection means 10 for detecting the transitions TD of the signal DS at the said counting frequency and for delivering corresponding detection signals ST.

More precisely, as illustrated highly schematically in this FIG. 1, the transition detection means 10 comprises a succession of three D-type flip-flops respectively referenced 100, 101 and 102, arranged in cascade and each controlled by the clock signal CKM. The input of the first flip-flop 100 receives the carrier signal DS. The outputs of the last two flip-flops 101 and 102 are linked to an exclusive OR logic gate referenced 103 whose output delivers the detection signal ST.

A logic circuit 2, the functionality of which will be returned to in greater detail below, and which can be produced in a conventional manner from logic gates, forms selection means 2. This selection means receives as input each detection signal ST delivered by the detection means 10 and delivers or otherwise, depending on a predetermined selection criterion, a selection signal RS. Of course, those skilled in the art will have appreciated that the selection signal in fact corresponds to a predetermined logic value, for example 1, of the logic signal delivered by the selection means 2.

Sampling control means 3 comprises in particular a counter modulo n (in this instance modulo 10) referenced 30 and clocked by the counting clock signal CKM. The output from this counter 30, that is to say its current counting value is taken into account on the one hand by the selection means 2 in a manner detailed below and, on the other hand, by logic means 31 of conventional construction. This means 31 is able to compare the current counting value SC with a first predetermined counting value corresponding to a first number of periods of the clock signal CKM, and consequently to a predetermined time delay Tr so as, when the current value of the counter reaches this first number, to deliver a sampling control signal SCH to a sampling flip-flop ECH enabling the signal DS to be sampled.

More particular reference will now be made to FIGS. 2 to 4 in order to describe in greater detail a mode of implementation of the sampling control according to the invention.

In FIG. 2, it is assumed that all the detected transitions TD of the signal DS are actually taken into account by the sampling control means. Stated otherwise, it is assumed here that every detected transition is a selected transition giving rise to the sending by the selection means of a selection signal RS. On receipt of each selection signal RS, the counter 30 is initialized to an initial counting value, for example 1, and then counts in tempo with the rising edges of the counting clock signal CKM. After a first predetermined number of periods of this counting signal, that is to say when the counter has reached a first counting value, for example the value 5, corresponding to the time delay Tr which is less than half T/2 the transmission period T (so as not to mask a succeeding transition TD such as drawn in FIG. 2), a sampling signal SCH is delivered.

Moreover, when the counter 30 reaches its final counting value, in this instance 10, it is reinitialized to its initial value. Under these conditions, as illustrated in FIG. 2, after a first sampling signal SCH1 has been delivered on termination of the time delay Tr following the detection of a transition, a second sampling signal SCH2 will automatically be delivered when the counter 30 has again reached its first counting value, that is to say on termination of the duration Tm equal to n times the counting period, this being so even though no other transition has been detected. Hence, this allows correct sampling of the signal DS when two binary information items with different logic values follow one another.

Figure 3:
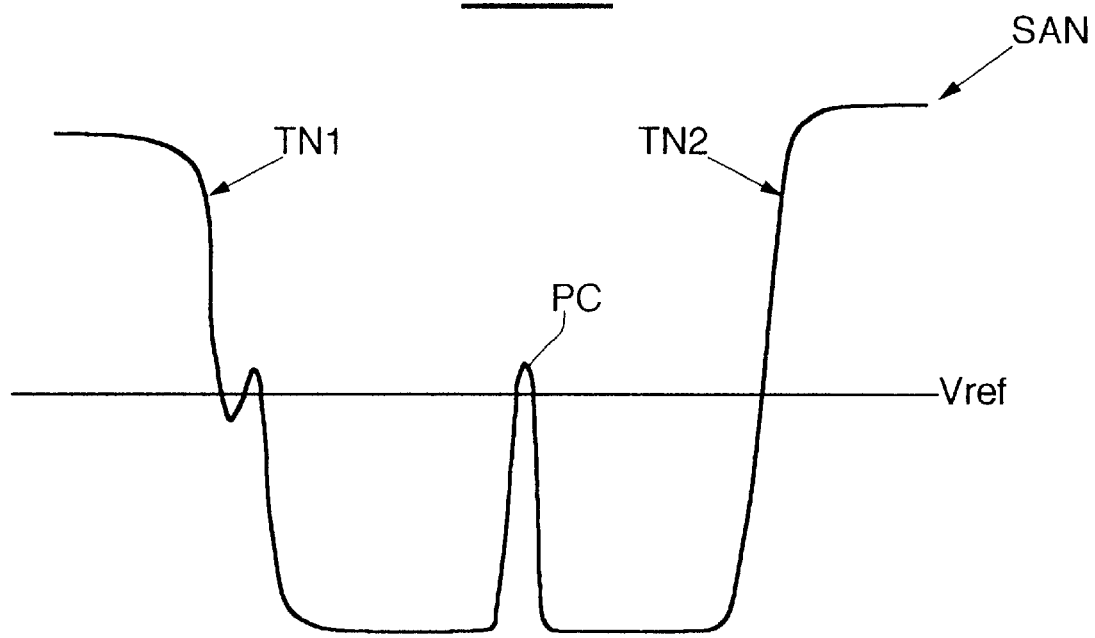
FIGS. 3 and 4 illustrate another implementation of the invention allowing better immunity to any distortions of the carrier signal.

Although the value of the delay Tr may, in certain applications, be taken equal to zero, it is particularly advantageous to choose it to be non-zero so as to take account of any significant distortions of the analog signal SAN, such as illustrated schematically in FIG. 3.

In this FIG. 3 it may be seen that a transition TN1 of the analog signal SAN, corresponding to a coding proper of a binary information item, may show up as a first crossing of the voltage Vref followed by a second closely-spaced crossing in the other direction of this transition Vref, and then by a third crossing in the opposite direction. Additionally, the signal SAN may exhibit, between two transitions TN1 and TN2, a spurious spike PC, the level of which may lie above the reference voltage Vref.

Figure 4:
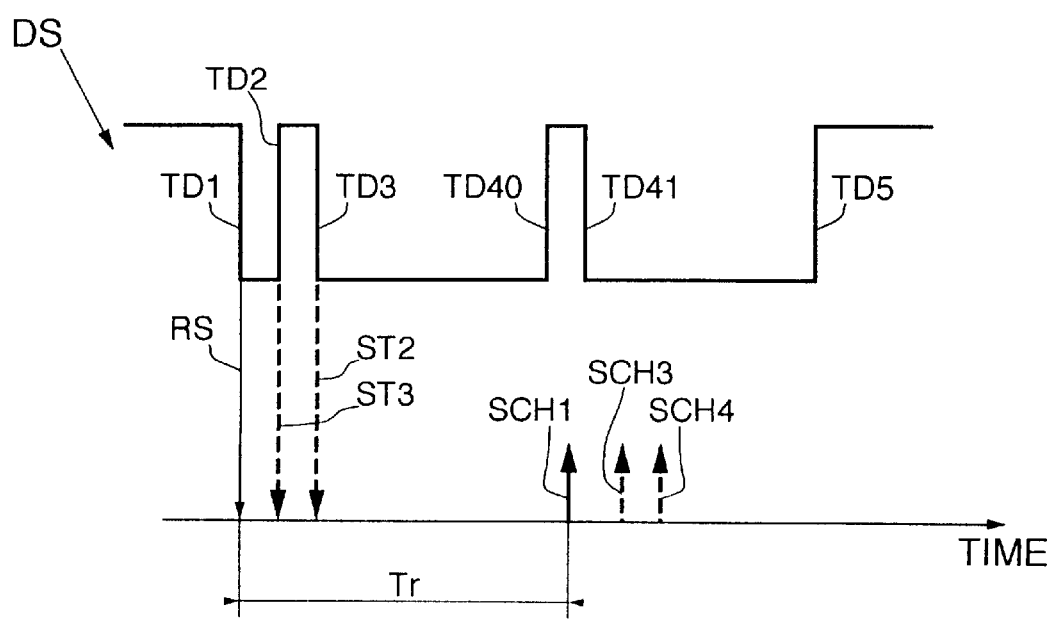

Hence, as illustrated in FIG. 4, it may be seen that the transition TN1 of the analog signal SAN shows up as three closely-spaced transitions TD1, TD2 and TD3 of the signal DS whereas the spurious spike PC shows up as two spurious transitions TD40 and TD41 of the signal DS.

In order to minimize the risk of sampling the signal DS on spurious levels of the signal DS, that is to say so as, in particular, not to risk sampling the signal DS between the transitions TD2 and TD3, a time delay Tr equal for example to a quarter of the transmission period T will be chosen. Stated otherwise, if the counter counts from 1 to 10, the value 5 will be chosen as the first counting value of the counter.

Additionally, it is preferable not to reinitialize the counter on the spurious transitions TD2 and TD3. Also, the selection means 2, receiving the detection signals ST2 and ST3 do not deliver, in response to these signals, a selection signal enabling the counter 30 to be reinitialized. In practice, a second predetermined number of periods of the counting signal CKM is fixed, corresponding to a second counting value of the counter. The selection logic circuit 2 then receives on the one hand the detection signal ST and on the other hand compares the current value of the counter with this second counting value so as to deliver a selection signal enabling this counter to be reinitialized only if the current value of the counter is greater than or equal to this second counting value.

Finally, it is possible that the sampling signal SCH1, delivered by the sampling control means on termination of the delay Tr following a detected transition TD1, may lead to the sampling of the spurious spike PC of the signal SAN (transitions TD40 and TD41 of the signal DS).

To overcome this drawback, there may be provision to oversample the signal DS between the transitions TD40 and TD5. Stated otherwise, the means 31 can compare the current value of the counter not only with the first counting value of the counter corresponding to the time delay Tr, but with at least one other counting value, greater than the first, so as to deliver at least one other sampling control signal SCH3, SCH4. The three sampling values (for example) corresponding to the three signals SCH1, SCH3 and SCH4, will then be processed by majority logic enabling elimination of the false sampling value of the spike PC.

The invention therefore makes it possible to construct a very simple digital device for control of sampling leading to sampling which is always well aligned with the transitions of the signal, this being so even if the actual frequency of transmission of the binary information is subject to variations.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A device for controlling sampling of a signal, the signal comprising a succession of transitions of level which are representative of two-phase coding of a binary information stream, wherein the coded information is transmitted at a transmission frequency which has a corresponding transmission period, the device comprising:

a. means for generating a counting clock signal with a counting frequency that is at most equal to 2n times the transmission frequency, with a corresponding counting period, wherein n is an integer;

b. detection means for detecting the transitions of the signal at the counting frequency, and for delivering a corresponding detection signal for each detected transition, wherein the detection means is coupled to the means for generating a counting clock signal;

c. selection means for receiving each detection signal, for determining whether or not a selection criterion is satisfied, and for delivering, if the selection criterion is satisfied, a selection signal, wherein the selection means is coupled to the detection means; and d. sampling control means for receiving each of the selection signals and for delivering, upon receipt of each selection signal, a first sampling control signal after a first delay time which is less than half the transmission period, and in the absence of another received selection signal within a spacing period, delivering a second sampling control signal temporally spaced from the first sampling control signal by the spacing period, wherein the sampling control means is coupled to the selection means.

2. The device of claim 1, wherein the spacing period is equal to n times the counting period.

3. The device of claim 1, wherein the sampling control means comprises the selection means.

4. The device of claim 1, wherein the detection means comprises the selection means.

5. The device of claim 1, wherein the counting frequency is less than n times twice the transmission frequency and greater than n−1 times twice the transmission frequency.

6. The device of claim 1, wherein n is an integer greater than or equal to 3, for example equal to 10.

7. The device of claim 1, wherein:

a. the sampling control means is coupled to the means for generating a counting clock signal and receives the counting clock signal; and b. the sampling control means comprises a counter-modulo-n clocked by the counting clock signal, and the counter-modulo-n can be initialized to an initial counting value upon the receipt of each selection signal, and the first sampling control signal is delivered whenever the counter modulo n reaches a first counting value.

8. The device of claim 7, wherein the first time delay is equal to a first predetermined number of the counting periods, and the difference between the first counting value and the initial counting value corresponds to the first predetermined number of periods.

9. The device of claim 1, wherein the selection means comprises means for determining the duration separating two consecutive detected transitions, and wherein the selection criterion comprises verifying that the duration is greater than or equal to a predetermined latency duration.

10. The device of claim 9, wherein the latency duration is equal to a second predetermined number of counting periods, and the selection means comprises comparison means for comparing the current value of the counter-modulo-n with a second predetermined counting value, the difference between the second counting value and the initial counting value corresponding to the second predetermined number of counting periods.

11. The device of claim 7, wherein the sampling control means comprises means for delivering at least one other sampling control signal whenever at least a third counting value, greater than the first, is reached.

12. A method for controlling sampling of a signal, the signal comprising a succession of transitions of level which are representative of two-phase coding of a binary information stream, wherein the coded information is transmitted at a transmission frequency which has a corresponding transmission period, the method comprising the steps of:

a. generating a counting clock signal with a counting frequency that is at most equal to 2n times the transmission frequency, with a corresponding counting period, wherein n is an integer;

b. detecting the transitions of the signal at the counting frequency, and delivering a corresponding detection signal for each detected transition;

c. receiving each detection signal, and determining whether or not a selection criterion is satisfied, and delivering, if the selection criterion is satisfied, a selection signal; and d. receiving each of the selection signals and delivering, upon receipt of each selection signal, a first sampling control signal after a first delay time which is less than half the transmission period, and in the absence of another received selection signal within a spacing period, delivering a second sampling control signal temporally spaced from the first sampling control signal by the spacing period.

13. A method for controlling sampling of a signal, the signal comprising a succession of transitions of level which are representative of two-phase coding of a binary information stream, wherein the coded information is transmitted at a transmission frequency which has a corresponding transmission period, the method comprising the steps of:

a. generating a counting clock signal with a counting frequency that is at most equal to 2n times the transmission frequency, with a corresponding counting period, wherein n is an integer;

b. detecting the transitions of the signal at the counting frequency;

c. determining whether or not a selection criterion is satisfied;

d. delivering, if the selection criterion is satisfied, a first sampling control signal after a first delay time which is less than half the transmission period; and e. delivering, if the selection criterion is not satisfied again within a spacing period, a second sampling control signal temporally spaced from the first sampling control signal by the spacing period.

* * * * *